UNITED STATES PATENT OFFICE.

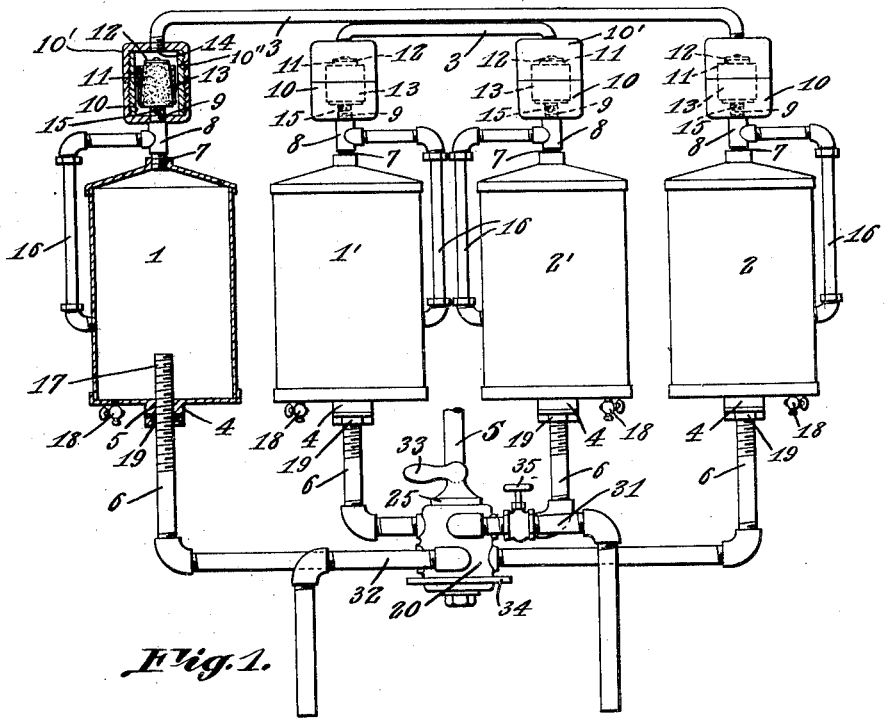

THOMAS L. HERBERT AND MORRIS W. ASKIN, OF WASHINGTON, DISTRICT OF COLUMBIA.

LIQUID-MEASURING DEVICE.

1,379,763.     Specification of Letters Patent.     Patented May 31, 1921.

Application filed January 9, 1920. Serial No. 350,355.

*To all whom it may concern:*

Be it known that we, THOMAS L. HERBERT and MORRIS W. ASKIN, citizens of the United States, residing at Washington, in the District of Columbia, have invented a new and useful Liquid-Measuring Device, of which the following is a specification.

This invention relates to liquid-handling devices and more particularly to a measuring instrument for use where large quantities of oil or gasolene are dispensed and has for its objects the provision of a device in which a pair of intercommunicating liquid containers having a predetermined capacity, are alternately filled and emptied.

The filling flow, coming from a source of supply under pressure produces pressure in the tank being filled, which pressure is transmitted to the tank being emptied. In this way the rate of speed with which the containers are discharged is largely dependent upon pressure in the supply line.

Another object is the provision of a novel form of valve mechanism whereby filling of a container is automatically terminated when the desired quantity has entered said container.

Still another object is the provision of adjustable means whereby the quantity of liquid discharged from the container may be regulated.

It is also an object of the present invention to provide for the deposit of foreign matter so that the same will not be discharged with the measured liquid but may be withdrawn from the container separately.

Other objects will present themselves as the description proceeds, it being within the province of the present disclosure to improve generally and to enhance the utility of devices of that class to which the present invention appertains.

Although the preferred embodiment of the present invention is herein shown and described it is to be understood that slight changes, falling within the scope of what is claimed, may be made without departing from the spirit, or sacrificing any of the advantages of the invention.

In the drawing:

Figure 1 is a view in elevation of the device there being parts shown in section.

Fig. 2 is a detail vertical sectional view of the hand valve used in connection with the device.

Fig. 3 is a horizontal sectional view taken on line 3—3 of Fig. 2.

Fig. 4 is a view similar to Fig. 2 and taken at right angles to the showing in Fig. 2.

Referring to the drawing by characters of reference, the numerals 1 and 2 designate a pair of tanks, the same being connected at their upper ends by a tube 3, so that air may pass freely from one to the other.

Tanks 1' and 2' are connected in the same manner as the tanks 1 and 2 and since all the tanks and equipment for the same are identical, it is thought a detailed description of one will suffice.

Each tank is provided at its lower end with a boss 4 having a threaded bore 5 into which is threaded a pipe 6. The pipe 6 serves both as a supply and discharge conduit. To the top of each tank is fitted a pipe nipple 7, and one branch of a pipe 8 is secured to the nipple, the other branch carries a second nipple 9. The nipple 9 has connected to its upper end a float chamber 10 comprising pipe caps 10' connected by a threaded nipple 10''. A float 11 is supported within the chamber 10 and is provided with a gasket 12. The float 11 comprises a cork body incased by a thin metal sleeve 13. The gasket 12 is adapted to close against a valve seat 14 which communicates with the pipe 3.

The end of the nipple 9 extends within the float chamber and is provided with side openings 15 so that with the float resting on the nipple 9, air is free to pass from the tank 1 through the connections just described to the tube 3 and thence to the tank 2 for a purpose to presently appear.

A sight gage 16 is connected to the tank and to one branch of the member 8, so that observation of the contents of the tank may be made at all times.

A portion of the conduit 6 extends into the tank 1 as shown at 17 the same terminating at a point above the bottom of the tank, and since in discharging from the tank, liquid will flow only to the level of the top of the pipe, a pocket or receptacle is formed below said level into which any water, sediment, or other extraneous matter may collect. A cock 18 is connected to the bottom of the tank for draining off the impurities thus collected.

As heretofore described the end of the pipe 8 is threadedly connected to the bottom of the tank. In this way the tank may be moved along the pipe and a greater or less length of said pipe extended into the tank which will result in a less or greater amount of liquid that will discharge from the tank at each operation. To prevent leakage through the bore 5, a gland 19 is mounted on the pipe 6 and seats against the boss 4.

A liquid supply pipe S is connected to a valve casing 20, the said casing being also connected to each of the tanks by means of a pipe 6, the said connections being made at ports indicated by the numerals 21, 22, 23 and 24. A valve plug 25 seated in the casing 20 is provided with ports 26 and 27. Delivery pipes 31 and 32 are connected to the valve casing and the ports 26 and 27 in the valve plug are adapted to connect the ports 21 and 22 or 23 and 24 with the delivery pipes 31 and 32. A port 30 formed in the plug or valve barrel 25 is in register with the supply inlet at all times and is adapted to place the said supply in communication with either of the pairs of ports 21 and 22 or 23 and 24 as the case may be.

A manipulating handle 33 is attached to the top of the plug 25, for operating the valve and a flange 34 is formed on the lower end of the valve casing 20 to provide means for attaching the valve to a suitable pedestal or other support.

It may here be observed that the ports 26 and 27 are separate, and individual to the ports 21, 23 and 22, 24 respectively, whereas the port 30 is common to the said ports in the casing so that during the tank filling operation the tanks are subjected to a common filling pressure whereas discharge from the tank is separate and distinct to each of the delivery pipes 31 and 32 from their respective tanks. A valve 35 is placed in one of the delivery pipes so that when it is desired to withdraw from but one container the other side of the system may be cut off.

In operation assuming that a supply of liquid under pressure is maintained in the supply line S and that the valve 25 is in the position shown in the drawing, fluid will flow from the port 30 through the ports 23 and 24, to the tanks 2' and 2 respectively, filling the same until the float 11 rests against the seat 14. When the float seats, flow from the supply is automatically stopped and the measured quantity of liquid is contained in each of the tanks.

The device always remains charged as thus described that is with two tanks filled and two empty. When it is desired to withdraw liquid the valve is rotated to bring the ports 26 and 27 into register with the supply S and ports 21 and 22.

The operation of filling the tanks 1 and 1' will proceed as previously described with reference to the tanks 2 and 2' and the air in the tanks 1 and 1' will be forced by the incoming flow of liquid through the connection 8 and 9, openings 15 and tube 3 to the top of the liquid in the tanks 2 and 2', the valve ports 26 and 27 now communicate with the delivery pipes 31 and 32 respectively and the liquid in the tanks 2 and 2' is forcibly discharged into containers provided to receive the same. In this way large quantities of liquid may be measured within a minimum loss of time, the speed of delivery being dependent on the head of pressure on the storage tank.

Having thus described the invention, what is claimed is:—

1. In a device of the class described tanks each embodying a part constituting a combined liquid inlet and liquid outlet; an air conduit connecting the tanks; a source of liquid supply; and a valve common to said parts and to the source, the valve operating to connect one of said parts with the source and simltaneously to place the other of said parts in communication with the atmosphere.

2. In a device of the class described tanks each embodying a part constituting a combined liquid inlet and liquid outlet; an air conduit connecting the tanks, the said conduit including means whereby a flow of liquid in the tank is stopped; a source of liquid supply; and a valve common to said parts and to the source, the valve operating to connect one of said parts with the source and simultaneously to place the other of said parts in communication with the atmosphere.

3. In a device of the class described a plurality of tanks each having a combined inlet and outlet conduit; air conduits connecting the tanks in pairs; a source of liquid supply; a check valve for each of the tanks interposed in the associated air conduit, the valves in each conduit being oppositely disposed; and a valve common to the said inlet and outlet conduits and to the source, and having ports for simultaneously connecting the source with a pair of conduits to the tanks and opening a pair of conduits to the atmosphere.

4. In a device of the class described, tanks each embodying a part constituting a combined liquid inlet and liquid outlet, said part extending within the tank, its upper level determining a maximum quantity of liquid to be discharged from the tank; an air conduit connecting the tanks; a source of liquid supply; and a valve common to the said parts and to the source and having ports for connecting one of said parts with the source and simultaneously placing the other of said parts in communication with a delivery port.

5. In a device of the class described tanks each embodying a part constituting a combined liquid inlet and liquid outlet connecting the tanks; a source of liquid supply; a valve common to said parts of the tanks and to the source, the valve operating to connect one of said parts with the source and to place the other of said parts in communication with the atmosphere, means for checking the flow of liquid in the tank and an air conduit connecting the tanks, whereby the pressure created in the tank being filled will be transmitted to the other tank to discharge the same.

In testimony that we claim the foregoing as our own, we have hereto affixed our signatures in the presence of two witnesses.

THOMAS L. HERBERT. [L. S.]
MORRIS W. ASKIN. [L. S.]

Witnesses:
VERLY H. RUSSELL,
TUNA S. RUSSELL.